(12) United States Patent
Tsuyama et al.

(10) Patent No.: US 6,682,200 B2
(45) Date of Patent: Jan. 27, 2004

(54) VEHICLE MIRROR DEVICE

(75) Inventors: Osamu Tsuyama, Isehara (JP); Akito Kikuchi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 10/262,656

(22) Filed: Oct. 2, 2002

(65) Prior Publication Data
US 2003/0086189 A1 May 8, 2003

(30) Foreign Application Priority Data

Oct. 2, 2001  (JP) ........................................ 2001-306727
Apr. 25, 2002 (JP) ........................................ 2002-124635

(51) Int. Cl.⁷ .............................................. G02B 7/182
(52) U.S. Cl. ........................ 359/876; 359/877; 359/864; 359/841
(58) Field of Search ................................. 359/876, 877, 359/864, 865, 871, 872, 873, 841, 850, 862; 248/478

(56) References Cited

U.S. PATENT DOCUMENTS

| 5,100,095 A | * | 3/1992 | Haan et al. ................. 248/549 |
| 5,539,584 A | | 7/1996 | Perry et al. |
| 5,568,326 A | | 10/1996 | Yoshida et al. |
| 5,946,151 A | | 8/1999 | Levko |
| 6,422,707 B2 | * | 7/2002 | Pirner et al. ................. 359/872 |
| 6,505,944 B1 | * | 1/2003 | Lewis ......................... 359/864 |
| 6,550,923 B2 | * | 4/2003 | Sakamoto et al. .......... 359/841 |

FOREIGN PATENT DOCUMENTS

JP        08-104172 A      4/1996

* cited by examiner

Primary Examiner—Mohammad Sikder
(74) Attorney, Agent, or Firm—Foley & Lardner

(57) ABSTRACT

A pivot portion is press-fitted to the inside hollow portion of a pivot receiver, thereby the pivot receiver wraps the pivot portion from outside. A spring member is also fitted to the outside on one end side of the pivot receiver, thereby the pivot receiver fastens the pivot portion from outside. As a result, the outer face of the pivot portion and the inner face of the hollow portion of the pivot receiver are abutted on each other securely all the time, thereby the mirror unit is held always stably with respect to the holding member. As a result, the mirror face can be held reliably at a predetermined tilted position all the time.

18 Claims, 9 Drawing Sheets

VEHICLE MIRROR DEVICE

BACKGROUND OF THE INVENTION

1) Field of the Invention

The present invention relates to a remote control-type vehicle mirror device in which the mirror face is tilted by a remote control, or a manual type vehicle mirror device in which the mirror face is tilted manually, for example, a rear-view mirror device for automobiles.

2) Description of the Related Art

As this type of vehicle mirror devices, there are, for example, one described in publication of unexamined patent applications (Japanese Patent Application Laid-Open No. 8-104172 (see FIG. 1, FIG. 4 and FIG. 5), one described in U.S. Pat. No. 5,539,584 (see FIG. 4 and FIG. 5), one described in U.S. Pat. No. 5,568,326 (see FIG. 1, FIG. 2, FIG. 4, FIG. 5 and FIG. 11), and one described in U.S. Pat. No. 5,946,151 (see FIG. 4 and FIG. 5).

In this type of vehicle mirror devices, a mirror unit is generally held tiltably in the horizontal direction and the vertical direction by a power unit, being a holding member, via a pivot mechanism. The pivot mechanism comprises a spherical convex surface provided on the mirror unit side, a spherical concave surface provided on the power unit side and a spring member, which makes the spherical convex surface and the spherical concave surface abut on each other by a spring force. By driving the power unit, the mirror unit tilts in the horizontal direction about a vertical axis, which passes through the center of the spherical convex surface and the center of the spherical concave surface of the pivot mechanism, and also tilts in the vertical direction about a horizontal axis passing through the centers thereof.

In the conventional vehicle mirror device, however, the spherical convex surface and the spherical concave surface are simply made to abut on each other by a spring force. Therefore, in the conventional vehicle mirror device, if a force larger than the spring force acts on the pivot mechanism in a direction opposite to the direction of action of the spring force, the spherical convex surface and the spherical concave surface may be away from each other totally or partially. In this case, the mirror unit is held unstably with respect to the power unit, and hence it becomes difficult to hold the mirror face at a predetermined tilted position.

SUMMARY OF THE INVENTION

It is an object of the present invention to provide a vehicle mirror device, in which the mirror unit is always held stably with respect to a holding member (power unit), and the mirror face can be held always at a predetermined tilted position.

To achieve the object, according to one aspect of this invention, a pivot receiver is provided in the mirror unit or the holding member, and a pivot portion is provided in the other thereof. A hollow portion is provided inside of the pivot receiver, and an opening communicating with the hollow portion is provided at one end of this pivot receiver. The pivot portion is press-fitted tiltably to the hollow portion from the opening of the pivot receiver, and a spring member is fitted to the outside on the one end side of the pivot receiver, to thereby fasten the pivot receiver onto the pivot portion.

According to the aspect, the pivot portion is press-fitted to the inside hollow portion of the pivot receiver, thereby the pivot receiver wraps the pivot portion from outside, and the spring member is fitted to the outside on the one end side of the pivot receiver, thereby the pivot receiver fastens the pivot portion from outside. Hence, in this invention, the outer face of the pivot portion and the inner face of the hollow portion of the pivot receiver abut on each other securely all the time, thereby the mirror unit is held always stably with respect to the holding member. As a result, the mirror face can be held reliably at a predetermined tilted position all the time.

These and other objects, features and advantages of the present invention are specifically set forth in or will become apparent from the following detailed descriptions of the invention when read in conjunction with the accompanying drawings.

DETAILED DESCRIPTIONS

Figure 1:
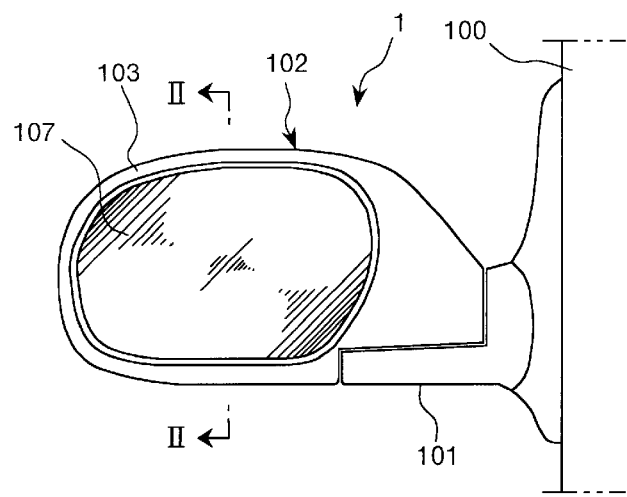
FIG. 1 is an elevational view in a used state which shows an embodiment of a vehicle mirror device according to the present invention.

One embodiment of the vehicle mirror device according to this invention will be explained, with reference to the accompanying drawings. The vehicle mirror device in this embodiment is a rear-view mirror device for automobiles, which shows an example where it is used for a remote-control type vehicle mirror device, however, this invention is by no means limited by this embodiment. In FIG. 3 to FIG. 6, reference numeral "F" denotes a traveling direction of a vehicle, and shows the front as seen from a driver side. Reference numeral "B" denotes a direction opposite to the traveling direction of the vehicle, and shows the rear side as seen from the driver side. Reference numeral "U" denotes the upper side as seen from the driver side. Reference numeral "D" denotes the lower side as seen from the driver side. Reference numeral "L" denotes the left side when a driver looks forward. Reference numeral "R" denotes the right side when the driver looks forward.

The construction of the vehicle mirror device according to this embodiment will be explained.

In these figures, reference numeral 1 denotes a vehicle mirror device according to this embodiment, a so-called door mirror device. This door mirror device 1 comprises a base 101 fixed to a door 100 of a vehicle, and a mirror assembly 102 equipped tiltably to the base 101, substantially about the vertical axis thereof. The door mirror device 1 in this embodiment is a left door mirror device equipped on the left side door 100 of a vehicle, and the construction of a right side door mirror device is substantially symmetric to the configuration of the left side door mirror device.

Figure 2:
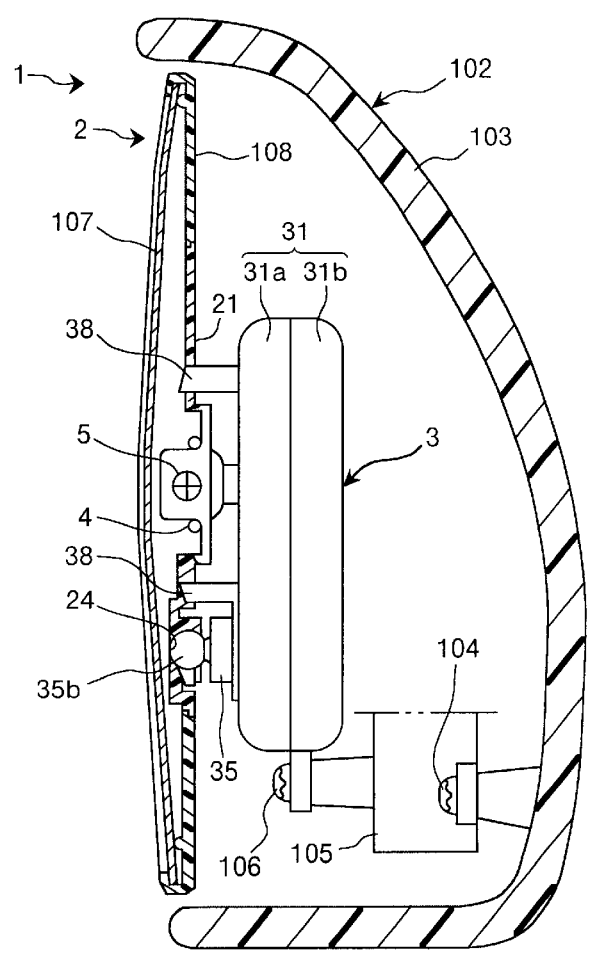
FIG. 2 is a sectional view along the line II—II in FIG. 1.

As shown in FIG. 2, the mirror assembly 102 comprises a mirror housing 103, a unit bracket 105 fitted to the mirror housing 103 by a screw 104 or the like, a power unit 3 as a holding member fitted to the unit bracket 105 by a screw 106 or the like, and a mirror unit 2 tiltably fitted to the power unit 3 by a pivot mechanism (a so-called center pivot) 5.

Thus, the door mirror device 1 in this embodiment is constructed such that the mirror unit 2 is tiltably held by the power unit 3 as the holding member, via the pivot mechanism 5.

The mirror unit 2 comprises, as shown in FIG. 2, a mirror body 107 having a mirror face (reflecting surface), a mirror holder 108 which holds the mirror body 107, and a mirror holder base 21 attached to the central portion of the mirror holder 108. In this example, the mirror holder 108 and the mirror holder base 21 are respectively a separate structure, and the mirror holder base 21 is attached to the central portion of the mirror holder 108, to thereby form an integral structure. In this invention, however, the mirror holder 108 and the mirror holder base 21 may be formed as an integral structure.

The mirror holder base 21 is, as shown in FIG. 2 to FIG. 6, respectively provided with horizontal pivot receivers 23 and 25, vertical pivot receiver 24, a pivot receiver 22 of the pivot mechanism 5, and left and right guiding shafts 26b. The pivot receiver 22 is provided substantially at the center of the mirror holder base 21. The horizontal pivot receivers 23 and 25 are provided at the left and right opposite ends of the mirror holder base 21, putting the pivot receiver 22 therebetween. The vertical pivot receiver 24 is provided at the lower end of the mirror holder base 21. The left and right guiding shafts 26b are provided at the left and right opposite ends of the mirror holder base 21, putting the pivot receiver 22 therebetween. The left and right guiding shafts 26b are spanned horizontally in openings 26 provided between the pivot receiver 22 and the horizontal pivot receivers 23 and 25. The mirror holder base 21 in this example can be shared by the left and right door mirror devices. In other words, the horizontal pivot receivers 23 provided on the left side of the pivot receiver 22 is formed so as to be combined with the power unit 3 in the left door mirror device 1. The horizontal pivot receiver 25 provided on the right side of the pivot receiver 22 is formed so as to be combined with the power unit in the right door mirror device.

The power unit 3 comprises, as shown in FIG. 2 to FIG. 6, a casing 31 constituted by combining a pair of split cases 31a and 31b, a drive motor (not shown) for tilting horizontally and a drive motor (not shown) for tilting vertically, respectively built in the casing 31, an advancing or retreating rod 34 for tilting horizontally, which advances or retreats from the casing 31 by the drive motor for tilting horizontally, and an advancing or retreating rod 35 for tilting vertically, which advances or retreats from the casing 31 by the drive motor for tilting vertically. Substantially spherical pivots 34b and 35b are formed at the end of the advancing or retreating rods 34 and 35. The drive motor is electrically connected to a power source (not shown) and a remote control switch (not shown), via a connector (not shown) and a harness (not shown).

A pivot portion 37 in the pivot mechanism 5 and left and right guiding sections 38 having a U-shape groove, respectively, are provided in the casing 31 (split case 31a). The pivot portion 37 is provided corresponding to the pivot receiver 22, substantially at the center of the casing 31 (a place slightly to the right upward from the center). The left and right guiding sections 38 are provided corresponding to the guiding shafts 26b and the openings 26 at the left and right opposite ends of the casing 31, putting the pivot portion 37 therebetween. The advancing or retreating rod 34 for tilting horizontally is provided corresponding to the horizontal pivot receiver 23, on the outer side of the guiding section 38 at the left end of the casing 31. The advancing or retreating rod 35 for tilting vertically is provided corresponding to the vertical pivot receiver 24 at the lower end of the casing 31.

The pivot mechanism 5 comprises the pivot receiver 22, the pivot portion 37 and a spring member 4.

The pivot portion 37 is press-fitted to the pivot receiver 22, and the spring member 4 is fitted to the pivot receiver 22 from outside. The pivots 34b and 35b of the advancing or retreating rods 34 and 35 are respectively press-fitted to the pivot receivers 23 and 24. The guiding sections 38 are fitted to the guiding shafts 26b. Thereby, the mirror holder base 21, that is, the mirror unit 2 is held by the power unit 3 as the holding member via the pivot mechanism 5, so as to be able to tilt horizontally and vertically.

Figure 3:
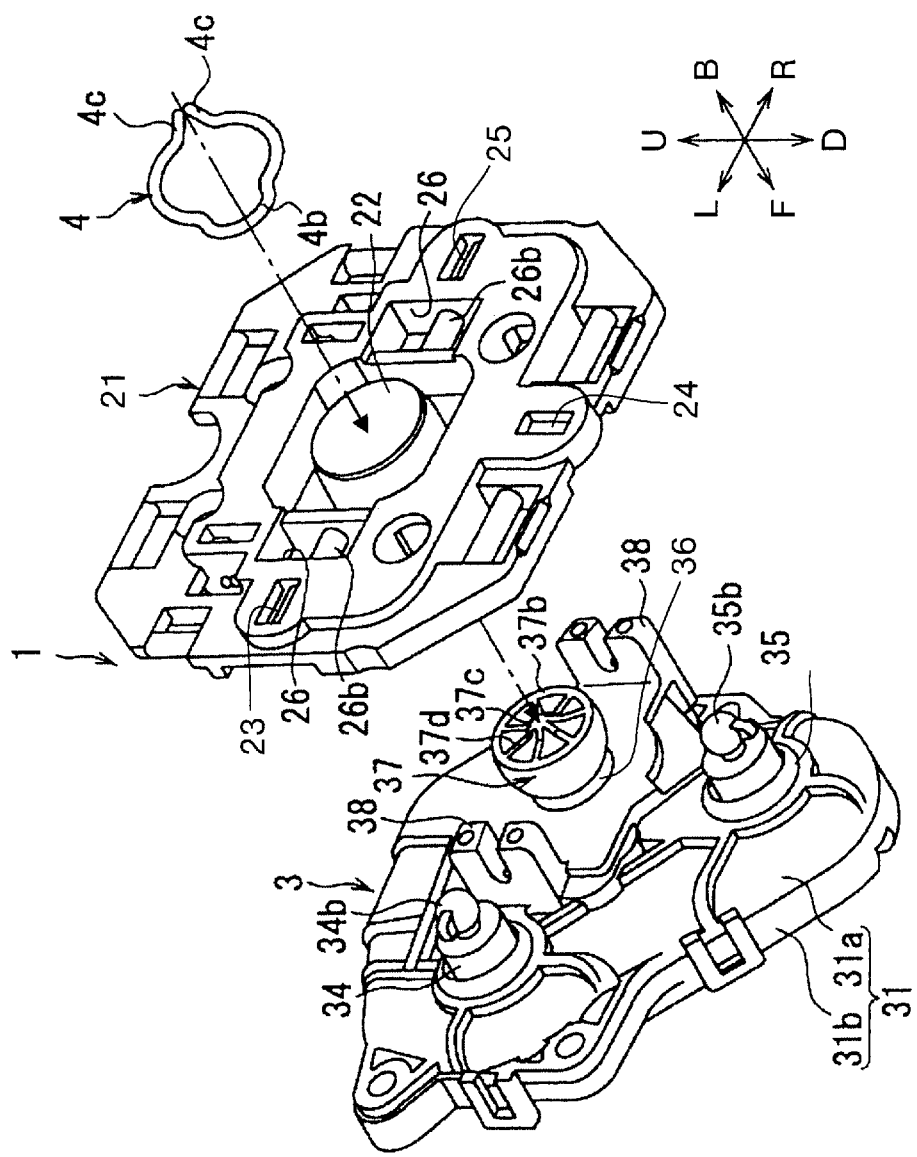
FIG. 3 is an exploded perspective view of a mirror holder base, a power unit and a pivot mechanism, which shows the main part.
Figure 4:
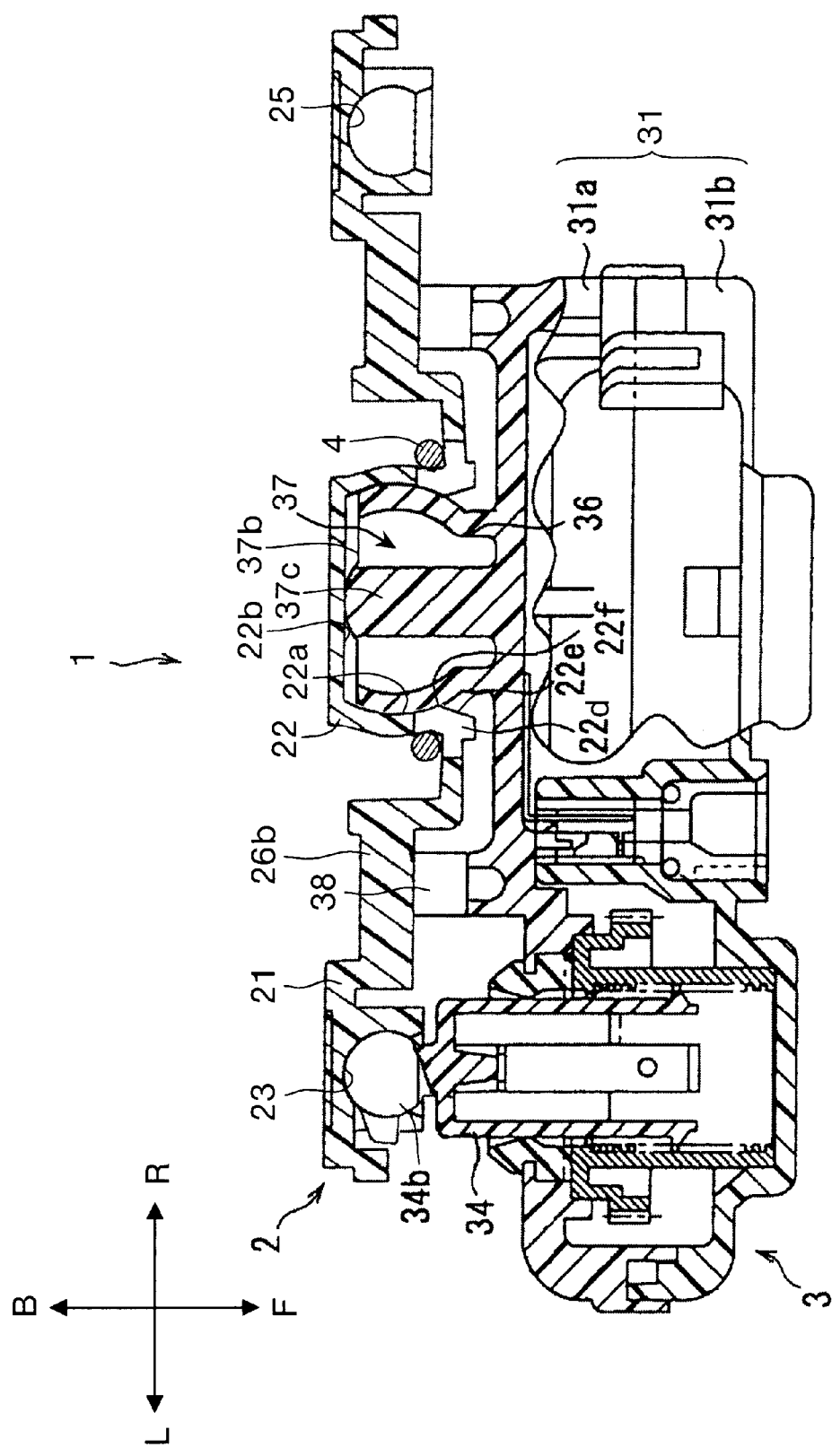
FIG. 4 is a sectional view of the mirror holder base, a power unit and the pivot mechanism, which shows a state where an advancing or retreating rod for driving in the horizontal direction is located at a medium position.
Figure 5:
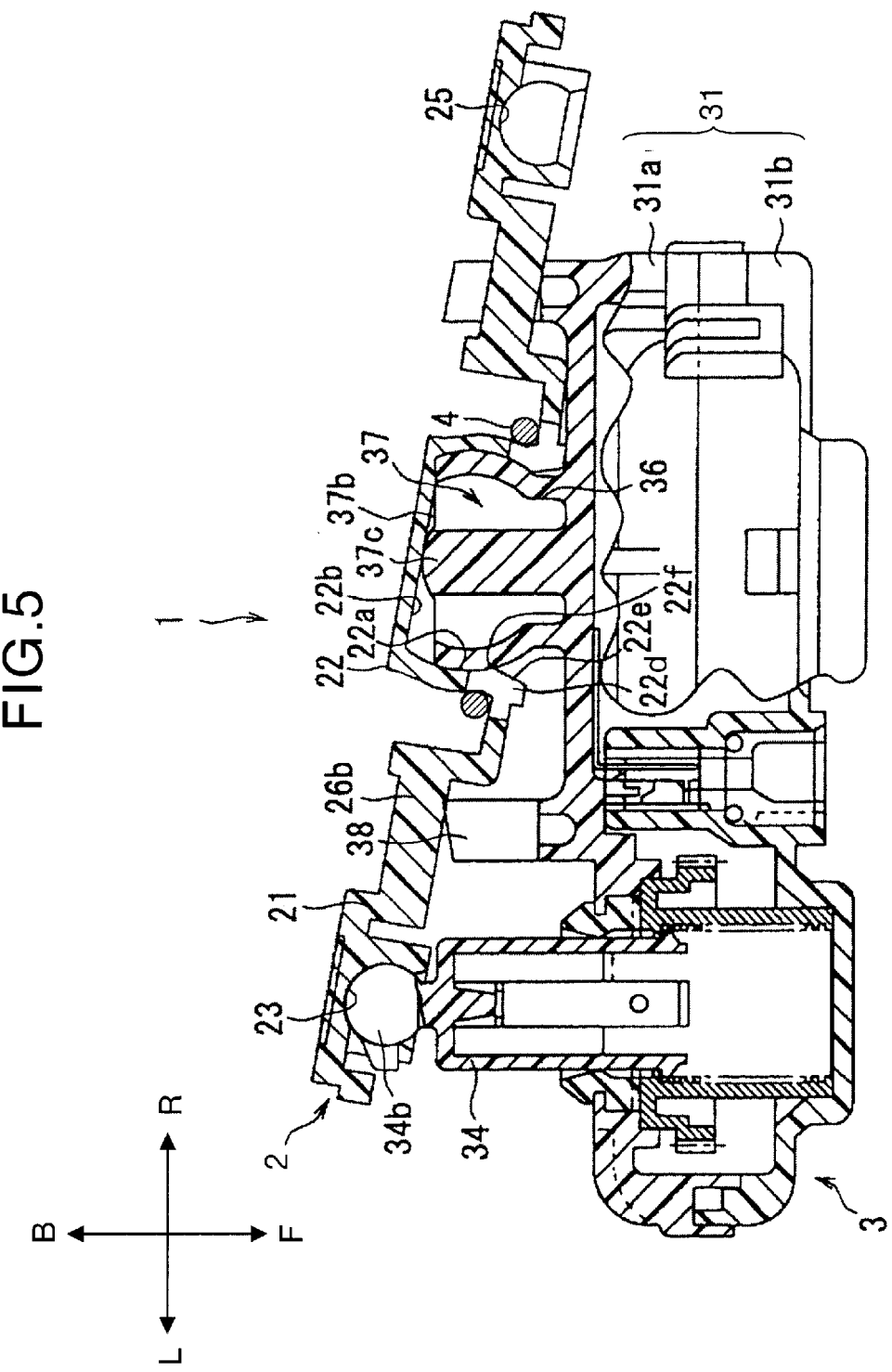
FIG. 5 is a sectional view of the mirror holder base, the power unit and the pivot mechanism, which shows a state where the advancing or retreating rod for driving in the horizontal direction is located at the most advanced position.
Figure 6:
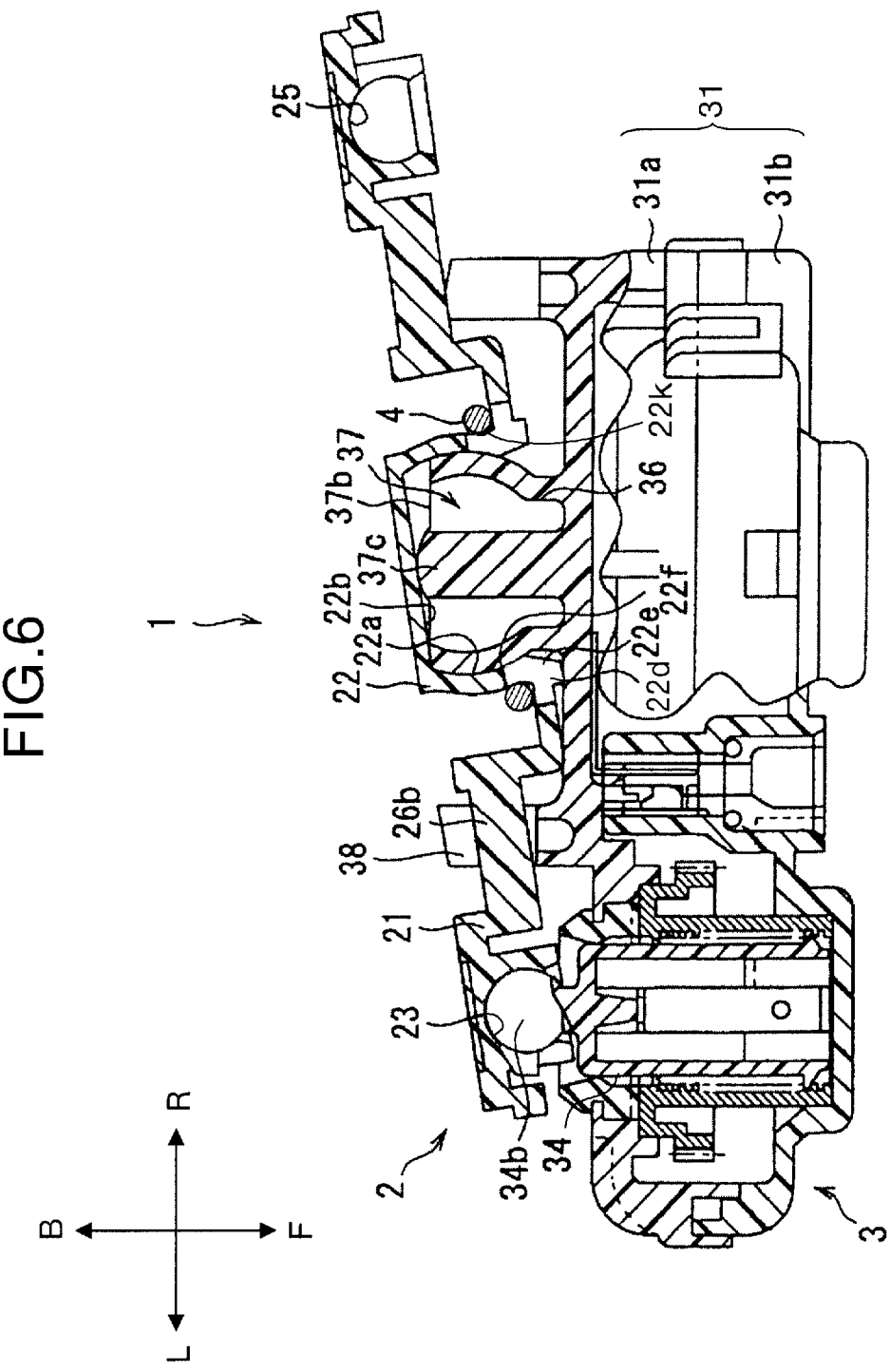
FIG. 6 is a sectional view of the mirror holder base, the power unit and the pivot mechanism, which shows a state where the advancing or retreating rod for driving in the horizontal direction is located at the most retreated position.
Figure 7:
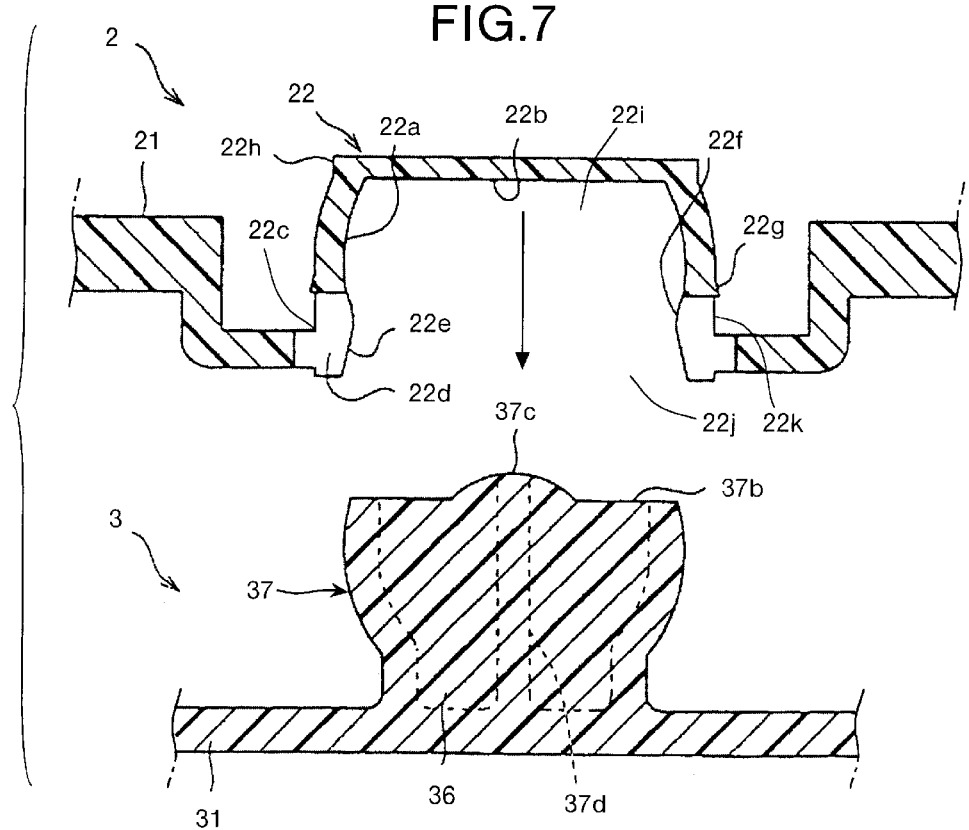
FIG. 7 is a sectional view which shows a state before the pivot portion is press-fitted to the pivot receiver.
Figure 8:
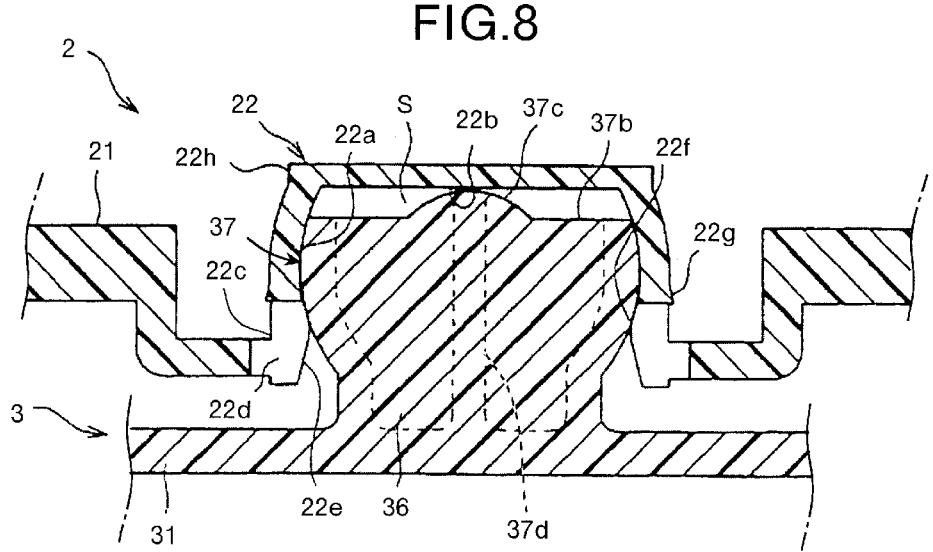
FIG. 8 is a sectional view which shows a state where the pivot portion is press-fitted to the pivot receiver.

The one end of the pivot portion 37 in the pivot mechanism 5 is formed, as shown in FIG. 3, FIG. 7 and FIG. 8, so as to protrude integrally substantially at the center of the casing 31 (split case 31a) of the power unit 3, via a shank 36. The external form of this pivot portion 37 is substantially spherical. A chamfered portion 37b is provided at the other end of the pivot portion 37, in a direction substantially orthogonal to the axial direction of the shank 36. By this chamfered portion 37b, the external shape of the pivot portion 37 becomes spherical, with the other end notched by about one fourth. A substantially spherical small protrusion 37c is integrally formed at the center of the chamfered portion 37b. The inside of the pivot portion 37 is formed hollow. Inside of the hollow pivot portion 37 are formed a plurality of, in this example, seven ribs 37d integrally and radially from the center.

The pivot receiver 22 in the pivot mechanism 5 is, as shown in FIG. 7 to FIG. 11, integrally provided substantially at the center of the mirror holder base in the mirror unit 2.

A hollow portion 22*i* is provided inside the pivot receiver 22. On the inner side of the hollow portion 22*i* of the pivot receiver 22 is provided a spherical inner face 22*a*, which resiliently abuts on the spherical outer face of the pivot portion 37 slidably. An opening 22*j*, which communicates with the hollow portion 22*i*, is provided at one end 22*c* of the pivot receiver 22. A neck portion 22*f* having an inner diameter (diameter) smaller than the largest outer diameter (diameter) of the pivot portion 37 is provided on the inner side of the opening 22*j*. As a result, the pivot portion 37 is press-fitted to the hollow portion 22*i* from the opening 22*j*.

The one end 22*c* of the pivot receiver is continuous from the mirror holder base 21. A fitting section 22*k*, to which the spring member 4 is fitted, is provided outside of the one end 22*c* of the pivot receiver 22. In this example, four slits 22*d* are provided, with substantially equal interval, at the one end 22*c* of the pivot receiver 22. In this example, four engaging protrusions 22*g* for preventing the spring member 4 from coming off are provided, with substantially equal interval, on the other end side than the fitting section 22*k* outside of the one end 22*c* of the pivot receiver 22. The four slits 22*d* and the four engaging protrusions 22*g* are provided corresponding to each other, and the four slits 22*d* are also used as holes for pulling out a mold for forming the four engaging protrusions 22*g*. On the inner side of the opening 22*j* of the pivot receiver 22 is formed a press-fit guiding face 22*e* which guides press-fit of the pivot portion 37, gradually enlarged towards the edge of the opening 22*j* from the neck portion 22*f*.

At the other end of the pivot receiver 22 is provided a flat portion 22*b* always with a space S between the chamfered portion 37*b* of the pivot portion 37 and itself, on which the small protrusion 37*c* of the pivot portion 37 abuts all the time. A temporary holder 22*h* for the spring member 4 is provided at the other end of the pivot receiver 22. This temporary holder 22*h* has a shelf shape (stepped shape), with the draft (pull-out angle) of the mold being substantially 0 degree. That is, the side of the temporary holder 22*h* is formed substantially vertical.

The spring member 4 of the pivot mechanism 5 is made of a metal, and formed of a ring-shaped wire rod having free ends 4*c*, which can be enlarged and deformed, designating a closed end 4*b* as a fulcrum. The inner diameter of the spring member 4 in a normal state shown in FIG. 3 is slightly smaller than the outer diameter of the temporary holder 22*h* of the pivot receiver 22, and smaller than the outer diameter of the fitting section 22*k* of the pivot receiver 22. The spring member 4 is temporarily held by the temporary holder 22*h* and pressed into the one end 22*c* of the pivot receiver 22 from the temporary holder 22*h*, to be fitted to the outside of the fitting section 22*k*, so that the pivot receiver 22 is fastened onto the pivot portion 37. The spring member 4 prevents the pivot receiver 22 from coming out from the pivot portion 37, and keeps the sliding torque between the pivot portion 37 and the pivot receiver 22 constant.

Figure 9A:
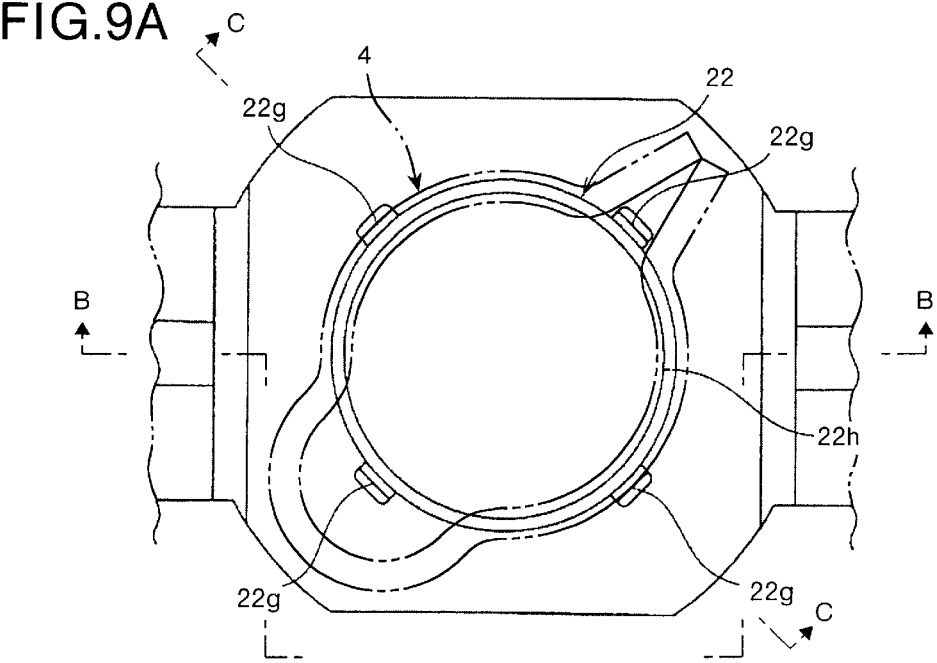
FIG. 9A is a partial plan view which shows a state before a spring member is temporarily held by a temporary holder of the pivot receiver.

The vehicle mirror device in this embodiment has such a configuration, and the assembly method thereof will be explained below. In FIG. 9 to FIG. 11, drawing of the power unit 3 side is omitted.

The power unit 3 and the mirror holder base 21 are positioned at a predetermined assembly position, and as shown by the arrow of one-dot chain line in FIG. 3 and by the arrow of solid line in FIG. 7, the mirror holder base 21 is pressed to the power unit 3 and assembled by a jig (not shown). That is, the pivot portion 37 is press-fitted to the pivot receiver 22. The pivots 34*b* and 35*b* of the advancing or retreating rods 34 and 35 are also press-fitted to the pivot receivers 23 and 24. The guiding sections 38 are also fitted to the guide shafts 26*b*. By fitting of the guide shafts 26*b* and the guiding sections 38, the mirror unit 2 is prevented from rotating about the axis of the shank 36 with respect to the power unit 3.

Figure 9B:
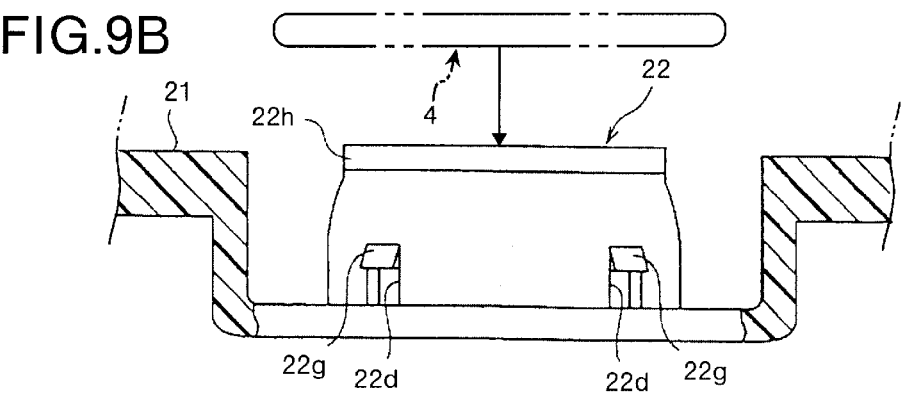
FIG. 9B is a sectional view along the line B—B in FIG. 9A.
Figure 9C:
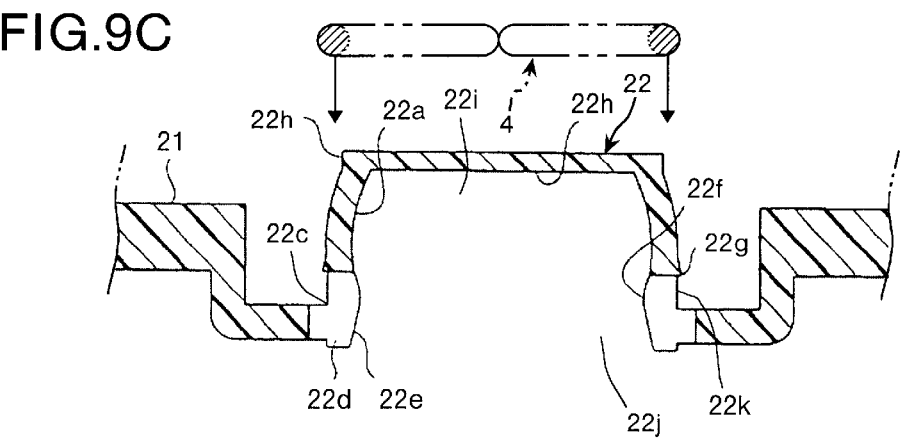
FIG. 9C is a sectional view along the line C—C in FIG. 9A.
Figure 10A:
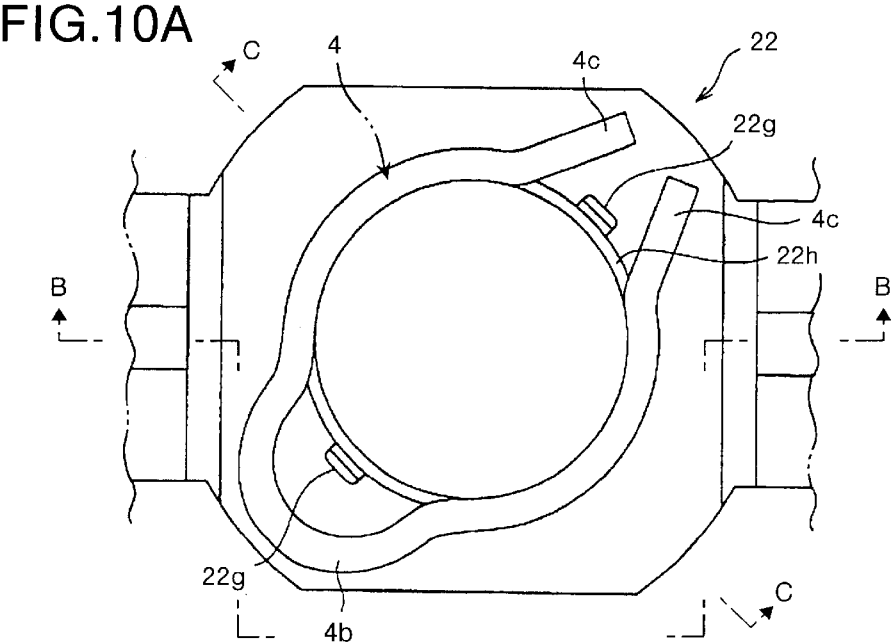
FIG. 10A is a partial plan view which shows a state where the spring member is temporarily held by the temporary holder of the pivot receiver.

As shown by the arrow of one-dot chain line in FIG. 3 and by the arrow of solid line in FIG. 9B and FIG. 9C, the spring member 4 is fitted into the temporary holder 22*h* of the pivot receiver 22 from outside by manually or by a jig (not shown), so as to be held temporarily. At this time, since the inner diameter of the spring member 4 is slightly smaller than the outer diameter of the temporary holder 22*h*, a slight spring force acts thereon in the state of being opened slightly, and as a result, the spring member 4 is temporarily held by the temporary holder 22*h* at a predetermined position, reliably in a predetermined posture.

Figure 10B:
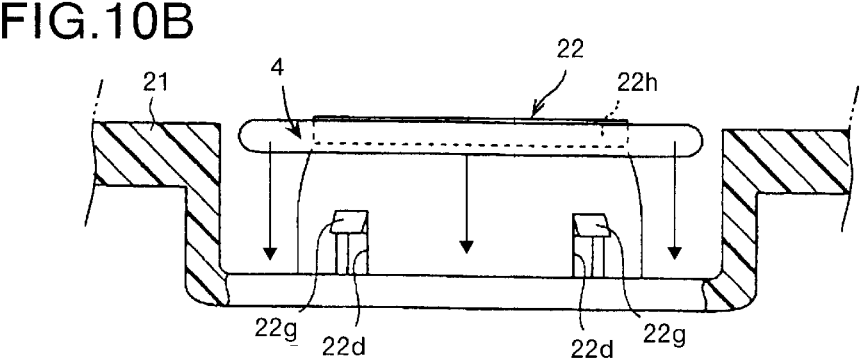
FIG. 10B is a sectional view along the line B—B in FIG. 10A.
Figure 10C:
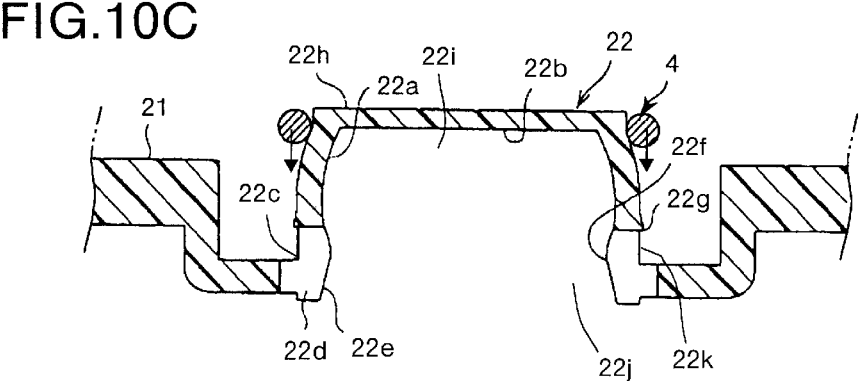
FIG. 10C is a sectional view along the line C—C in FIG. 10A.
Figure 11A:
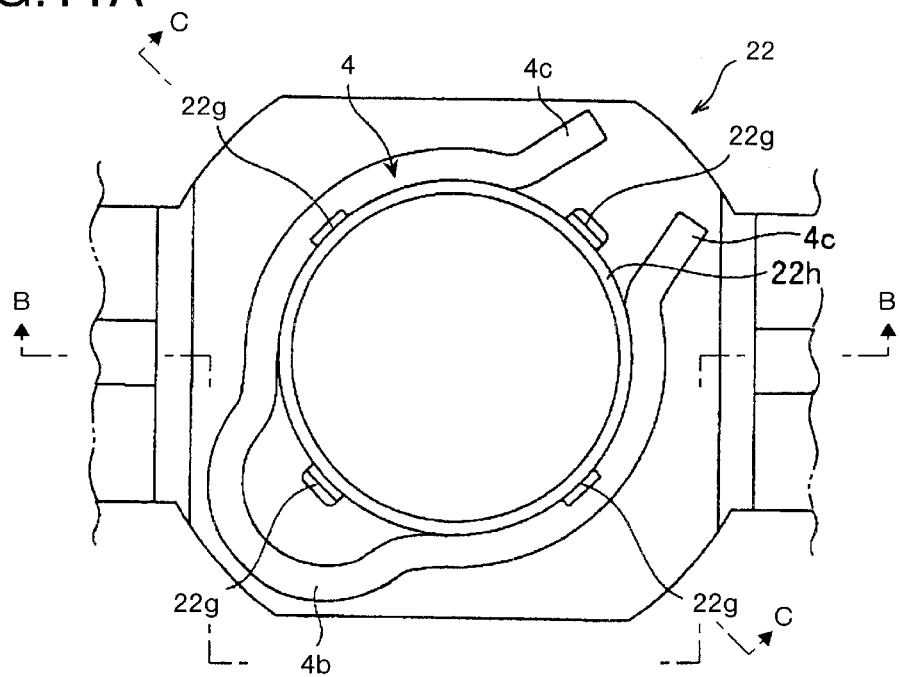
FIG. 11A is a partial plan view which shows a state where the spring member is fitted to a fitting section of the pivot receiver.
Figure 11B:
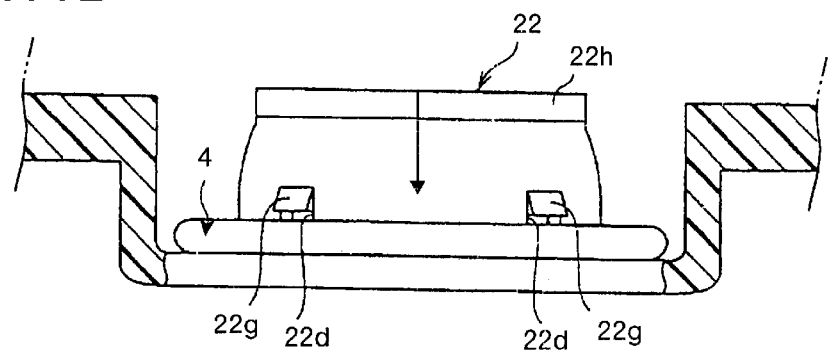
FIG. 11B is a sectional view along the line B—B in FIG. 11A.
Figure 11C:
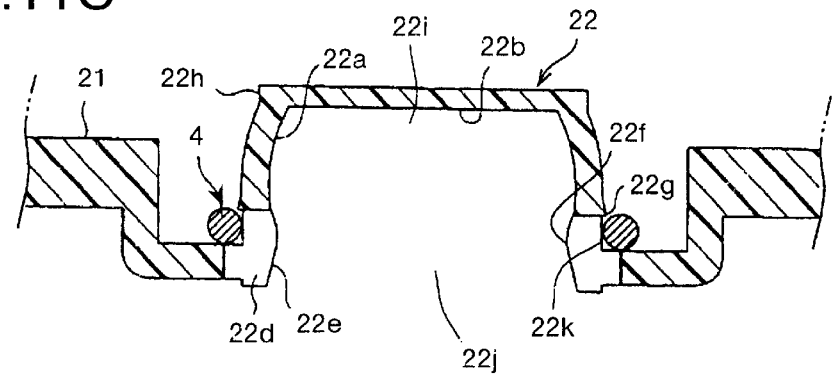
FIG. 11C is a sectional view along the line C—C in FIG. 11A.

As shown by the arrow of solid line in FIG. 10B and FIG. 10C, the spring member 4 is press-fitted to the one end 22*c* of the pivot receiver 22 from the temporary holder 22*h*, which holds the spring member 4 temporarily, by a press-fit jig (not shown). As shown in FIG. 11A, FIG. 11B and FIG. 11C, the spring member 4 is fitted to the outside of the fitting section 22*k*, getting over the engaging protrusion 22*g* in the middle of the pivot receiver 22. At this time, since the inner diameter of the spring member 4 is smaller than the outer diameter of the fitting section 22*k*, the spring force of the spring member 4 acts on the fitting section 22*k*, and as a result, the pivot receiver 22 is reliably fastened on the pivot portion 37.

After the mirror holder base 21 has been assembled to the power unit 3, the mirror holder 108 holding the mirror body 107 is assembled to the mirror holder base 21. When the mirror holder 108 and the mirror holder base 21 are formed as an integral structure, after the integral structure is assembled to the power unit 3, the mirror body 107 is assembled to the integral structure.

In this manner, assembly of the power unit 3 and the mirror holder base 21 is performed in one direction, as shown by the arrow of one-dot chain line in FIG. 3, by the arrow of solid line in FIG. 7, by the arrow of solid line in FIG. 9B and FIG. 9C, and by arrow of solid line in FIG. 10B and FIG. 10C, and hence the assembling operation is easy and automization is also possible.

The vehicle mirror device in this embodiment has such a configuration, and the action thereof will be explained below.

By the operation of the remote control switch from a driver's seat in a vehicle, power is fed to the motor for horizontal tilting. The motor for horizontal tilting is driven, thereby the advancing or retreating rod 34 for horizontal tilting advances or retreats. Accompanying this, the mirror unit 2 tilts horizontally about the vertical axis (an axis connecting the center of the pivot mechanism 5 and the centers of the vertical pivot receiver 24 and the pivot 35*b*), which passes through the center of the pivot mechanism 5, with respect to the power unit 3, via the mirror holder base 21 (see FIG. 4 to FIG. 6). The motor for vertical tilting is also fed with power. The motor for vertical tilting is then driven, thereby the advancing or retreating rod 35 for vertical tilting advances or retreats. Accompanying this, the mirror unit 2 tilts vertically about the horizontal axis (an axis connecting the center of the pivot mechanism 5 and the center of the horizontal pivot receiver 23 and the pivot 34*b*), which passes through the center of the pivot mechanism 5, with respect to the power unit 3, via the mirror holder base 21.

Since the vehicle mirror device in this embodiment has such a configuration, the following effects can be obtained.

That is to say, in the vehicle mirror device in this embodiment, the pivot portion 37 is press-fitted to the hollow portion 22i of the pivot receiver 22, thereby the pivot receiver 22 wraps the pivot portion 37 from outside. Further, the spring member 4 is fitted to the outside of the fitting section 22k of the pivot receiver 22, thereby the pivot receiver 22 fastens the pivot portion 37 from outside. Therefore, in the vehicle mirror device in this embodiment, the spherical outer face of the pivot portion 37 resiliently abuts on the spherical inner face of the hollow portion 22i of the pivot receiver 22, reliably and tiltably at all times, and hence the mirror unit 2 is held with respect to the power unit 3 as the holding member, in a stable condition at all times. Therefore, in the vehicle mirror device in this embodiment, the mirror face of the mirror unit 2 can be reliably held at a predetermined tilted position at all times.

Particularly, in the vehicle mirror device in this embodiment, when the advancing or retreating rods 34 and 35 are located at the most advanced position or at the most retreated position, the mirror unit 2 does not float up with respect to the power unit 3, as in the conventional vehicle mirror device in which the spherical convex face is simply made to abut on the spherical concave face.

In the vehicle mirror device in this embodiment, since the spring member 4 is fitted to the outside of the one end 22c (fitting section 22k) of the pivot receiver 22 to fasten the pivot receiver 22 onto the pivot portion 37, the pivot receiver 22 can be prevented from coming out from the neck portion 22f of the pivot portion 37. Even if the fitting force of the pivot receiver 22 decreases with the lapse of time, the sliding torque between the pivot portion 37 and the pivot receiver 22 can be kept constant at all times by the spring force of the spring member 4.

In the vehicle mirror device in this embodiment, since the small protrusion 37c of the pivot portion 37 abuts on the flat portion 22b of the pivot receiver 22 at all times, there is no play between the spherical outer face of the pivot portion 37 and the spherical inner face of the hollow portion 22i of the pivot receiver 22, and hence the spherical outer face and the spherical inner face abut on each other reliably al all times.

In the vehicle mirror device in this embodiment, since there is always a space S between the flat portion 22b of the pivot receiver 22 and the chamfered portion 37b of the pivot portion 37, even if the pivot mechanism 5 (the pivot receiver 22 and the pivot portion 37) is made thin in a direction of the shank 36, the mirror unit 2 can tilt with respect to the power unit 3, using the space S.

In the vehicle mirror device in this embodiment, since the slits 22d are provided at one end 22c of the pivot receiver 22, that is, at the end on the side inserting the pivot portion 37, when the pivot portion 37 is press-fitted, the one end 22c of the pivot receiver 22 is enlarged and deformed. Therefore, the press-fit force at the time of press-fitting the pivot portion 37 to the pivot receiver 22 can be reduced.

In the vehicle mirror device in this embodiment, since the press-fit guiding face 22e is provided on the inner side of the opening 22j of the pivot receiver 22, even in an operation not visible, the pivot portion 37 can be reliably and easily press-fitted to the pivot receiver 22, by the guiding action of the press-fit guiding face 22e.

In the vehicle mirror device in this embodiment, since the temporary holder 22h is provided at the other end of the pivot receiver 22, the spring member 4 can be temporarily held by the temporary holder 22h at a predetermined position, reliably in a predetermined posture. Thereby, the spring member 4 can be reliably and simply press-fitted by a press-fit jig, from the temporary holder 22h to the fitting section 22k at a predetermined position of the pivot receiver 22, in a predetermined posture.

In the vehicle mirror device in this embodiment, since the engaging protrusion 22g is provided on the other end side than the fitting section 22k of the pivot receiver 22, the spring member 4 can be reliably fitted to the fitting section 22k at a predetermined position. When the spring member 4 is once press-fitted to the fitting section 22k, getting over the engaging protrusion 22g, the engaging protrusion 22g prevents the spring member 4 from coming off from the fitting section 22k.

In the vehicle mirror device in this embodiment, four slits 22d and four engaging protrusions 22g of the pivot receiver 22 are provided corresponding to each other, and the four slits 22d are also used as holes for pulling out a mold for forming the four engaging protrusions 22g. As a result, the structure of the pivot receiver 22 can be simplified.

In the vehicle mirror device in this embodiment, since the inside of the pivot portion 37 is formed hollow, the thickness of the pivot portion 37 can be made small, and shrinkage at the time of molding the pivot portion 37 can be prevented by the thin pivot portion 37. Further, since the seven ribs 37d are formed inside of the hollow pivot portion 37, even if the inside of the pivot portion 37 is formed hollow and the thickness of the pivot portion 37 is small, sufficient strength can be obtained.

In this embodiment, a remote-control type rear-view mirror device (door mirror device 1) for vehicles has been explained. However, this invention is also applicable to a vehicle mirror device other than the door mirror device 1. For example, this invention is applicable to a vehicle mirror device of manually tilting type, in which the mirror unit is tiltably held by a mirror housing as a holding member, via the pivot mechanism. In the vehicle mirror device of manually tilting type, the pivot receiver can be provided on the mirror housing side, being the holding member, and the pivot portion can be provided on the mirror unit side.

In the claims and the specification, "right and left" or "horizontal direction" stands for "right and left" or "horizontal direction" about a vertical axis, in the state where the vehicle mirror device is equipped on a vehicle. Further, in the claims and the specification, "up and down" or "vertical direction" stands for "up and down" or "vertical direction" about a horizontal axis, in the state where the vehicle mirror device is equipped on a vehicle.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application 2001-306727, filed Oct. 2, 2001, and Japanese Patent Application 2002-124635, filed Apr. 25, 2002, both of which are incorporated herein by reference in their entirety.

What is claimed is:

1. A vehicle mirror device in which a mirror unit is tiltably held by a holding member via a pivot mechanism, wherein the pivot mechanism comprises:
   a pivot receiver provided in the mirror unit or the holding member, which has a hollow portion provided inside thereof, wherein an opening communicating with the hollow portion is provided at one end thereof;

a pivot portion provided in the other of the mirror unit and the holding member, which is tiltably press-fitted to the hollow portion from the opening of the pivot receiver; and a spring member fitted around and to the outside of the hollow portion of the pivot receiver, which fastens the pivot receiver onto the pivot portion.

2. The vehicle mirror device according to claim 1, wherein the external shape of the pivot portion is substantially spherical, a spherical inner face, which resiliently abuts on the spherical outer face of the pivot portion slidably, is provided on the inner side of the hollow portion of the pivot receiver, and a neck portion having an inner diameter smaller than the largest outer diameter of the pivot portion is provided on the inner side of the opening of the pivot receiver.

3. The vehicle mirror device according to claim 1, wherein the one end of the pivot portion is provided in the other of the mirror unit and the holding member via a shank, and a chamfered portion is provided at the other end of the pivot portion, in a direction substantially orthogonal to the shank, and a small protrusion is provided substantially at the center of the chamfered portion, and a flat portion is provided at the other end of the pivot receiver, always with a space between the chamfered portion and itself, against which the small protrusion abuts all the time.

4. The vehicle mirror device according to claim 1, wherein one end of the pivot receiver is provided in the mirror unit or the holding member, and a plurality of slits are provided on the one end of the pivot receiver.

5. The vehicle mirror device according to claim 1, wherein a press-fit guiding face which guides press-fit of the pivot portion is formed on the inner side of the opening of the pivot receiver, gradually enlarged towards the edge of the opening.

6. The vehicle mirror device according to claim 1, wherein a temporary holder for the spring member is provided at the other end of the pivot receiver, and by press-fitting the spring member temporarily held by the temporary holder from the temporary holder to the one end of the pivot receiver, the spring member is fitted to the outside on the one end side of the pivot receiver.

7. The vehicle mirror device according to claim 1, wherein a plurality of engaging protrusions for preventing the spring member from coming off is provided on the other end side than the fitting section, to which the spring member is fitted, outside of the one end of the pivot receiver.

8. The vehicle mirror device according to claim 1, wherein one end of the pivot receiver is provided in the mirror unit or the holding member, and slits are provided on the one end of the pivot receiver, engaging protrusions for preventing the spring member from coming off are provided on the other end side than the fitting section, to which the spring member is fitted, outside of the one end of the pivot receiver, and the slits and the engaging protrusions are provided corresponding to each other, and the slits are also used as holes for pulling out a mold for forming the engaging protrusions.

9. The vehicle mirror device according to claim 1, wherein the inside of the pivot portion is formed hollow, and a plurality of ribs are formed inside of the hollow pivot portion.

10. A remote-control type vehicle mirror device in which a mirror unit is held by a power unit as a holding member via a pivot mechanism, tiltably in horizontal and vertical directions, wherein the pivot mechanism comprises:

a pivot receiver provided in the mirror unit, which has a hollow portion provided inside thereof, wherein an opening communicating with the hollow portion is provided at one end thereof;

a pivot portion provided in the power unit, which is tiltably press-fitted to the hollow portion from the opening of the pivot receiver; and a spring member fitted around and to the outside of the hollow portion of the pivot receiver, which fastens the pivot receiver onto the pivot portion.

11. The vehicle mirror device according to claim 10, wherein the external shape of the pivot portion is substantially spherical, a spherical inner face, which resiliently abuts on the spherical outer face of the pivot portion slidably, is provided on the inner side of the hollow portion of the pivot receiver, and a neck portion having an inner diameter smaller than the largest outer diameter of the pivot portion is provided on the inner side of the opening of the pivot receiver.

12. The vehicle mirror device according to claim 10, wherein the one end of the pivot portion is provided in the power unit via a shank, and a chamfered portion is provided at the other end of the pivot portion, in a direction substantially orthogonal to the shank, and a small protrusion is provided substantially at the center of the chamfered portion, and a flat portion is provided at the other end of the pivot receiver, always with a space between the chamfered portion and itself, on which the small protrusion abuts all the time.

13. The vehicle mirror device according to claim 10, wherein one end of the pivot receiver is provided in the mirror unit, and slits are provided on the one end of the pivot receiver.

14. The vehicle mirror device according to claim 10, wherein a press-fit guiding face which guides press-fit of the pivot portion is formed on the inner side of the opening of the pivot receiver, gradually enlarged towards the edge of the opening.

15. The vehicle mirror device according to claim 10, wherein a temporary holder for the spring member is provided at the other end of the pivot receiver, and by press-fitting the spring member temporarily held by the temporary holder from the temporary holder to the one end of the pivot receiver, the spring member is fitted to the outside on the one end side of the pivot receiver.

16. The vehicle mirror device according to claim 10, wherein engaging protrusions for preventing the spring member from coming off are provided on the other end side than the fitting section, to which the spring member is fitted, outside of the one end of the pivot receiver.

17. The vehicle mirror device according to claim 10, wherein one end of the pivot receiver is provided in the mirror unit, and slits are provided on the one end of the pivot receiver, engaging protrusions for preventing the spring member from coming off are provided on the other end side than the fitting section, to which the spring member is fitted, outside of the one end of the pivot receiver, and the slits and the engaging protrusions are provided corresponding to each other, and the slits are also used as holes for pulling out a mold for forming the engaging protrusions.

18. The vehicle mirror device according to claim 10, wherein the inside of the pivot portion is formed hollow, and ribs are formed inside of the hollow pivot portion.

* * * * *